(12) United States Patent
Ishiazaki et al.

(10) Patent No.: US 9,683,146 B2
(45) Date of Patent: Jun. 20, 2017

(54) ADHESIVE COMPOSITION

(71) Applicant: TOAGOSEI CO., LTD., Tokyo (JP)

(72) Inventors: Kenichi Ishiazaki, Nagoya (JP); Yushi Ando, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 14/916,032

(22) PCT Filed: Aug. 7, 2014

(86) PCT No.: PCT/JP2014/070934
§ 371 (c)(1),
(2) Date: Mar. 2, 2016

(87) PCT Pub. No.: WO2015/033738
PCT Pub. Date: Mar. 12, 2015

(65) Prior Publication Data
US 2016/0200951 A1    Jul. 14, 2016

(30) Foreign Application Priority Data

Sep. 3, 2013    (JP) ................................. 2013-182418

(51) Int. Cl.
| | | |
|---|---|---|
| C09J 133/12 | (2006.01) | |
| C09J 133/22 | (2006.01) | |
| C09J 133/14 | (2006.01) | |
| C09J 121/00 | (2006.01) | |
| C09J 201/10 | (2006.01) | |

(52) U.S. Cl.
CPC ........... *C09J 133/22* (2013.01); *C09J 121/00* (2013.01); *C09J 133/14* (2013.01); *C09J 201/10* (2013.01)

(58) Field of Classification Search
CPC ....... C09J 133/22; C09J 201/10; C08L 101/10
See application file for complete search history.

(56) References Cited

U.S. PATENT DOCUMENTS

| | | | |
|---|---|---|---|
| 4,440,910 A * | 4/1984 | O'Connor ................. | C09J 4/06 524/533 |
| 2010/0041810 A1 | 2/2010 | Wakabayashi et al. | |
| 2013/0174981 A1 | 7/2013 | Kelly et al. | |

FOREIGN PATENT DOCUMENTS

| | | |
|---|---|---|
| JP | 57-070169 A | 4/1982 |
| JP | S63-12677 | 1/1988 |
| JP | 02-034678 A | 2/1990 |
| JP | H2-34678 A | 2/1990 |
| JP | 03-265676 A | 11/1991 |
| JP | 06-057214 A | 3/1994 |
| JP | H6-57214 A | 3/1994 |
| JP | 06-122853 A | 5/1994 |
| JP | 06-145605 A | 5/1994 |
| JP | H6-145605 A | 5/1994 |
| JP | 06-240209 A | 8/1994 |
| JP | H6-240209 A | 8/1994 |
| JP | H03-265676 A | 11/1996 |
| JP | 63-046282 A | 2/1998 |
| JP | 2009-500517 A | 1/2009 |
| JP | 2011-208073 A | 10/2011 |
| WO | 2012/139965 A1 | 10/2012 |

OTHER PUBLICATIONS

International Search Report for PCT/JP2014/070934 mailed on Oct. 14, 2014; English Translation submitted herewith (5 Pages).
Guthrie et al., Hydrolysis of esters of oxy acids; pKa values for strong acids; Bronsted relationship for attack of water at methyl; free energies of hydrosis of esters of oxy acids; and a linear relationship between free energy of hydrosis and pKa holding over a range of 20pK units; J. Can. Chem., 56-2342-2354 (1978).
Office Action mailed Jan. 7, 2017 in U.S. Appl. No. 14/915,981.
EPO Supplemental Search Report dated Apr. 10, 2017 issued in EP Application 14842697.6.

* cited by examiner

*Primary Examiner* — Kuo-Liang Peng
(74) *Attorney, Agent, or Firm* — Fitch, Even, Tabin & Flannery LLP

(57) ABSTRACT

Provided is an adhesive composition which is flexible, and exhibits excellent adhesion durability. The adhesive composition comprises (a) a 2-cyanoacrylic acid ester, (b) a polymer having a hydrolyzable silyl group, (c) an elastomer, and (d) an acid catalyst, in which the contents of the components (b), (c), and (d) are from 5 to 200 parts by mass, from 5 to 50 parts by mass, and from 0.0005 to 0.5 parts by mass, respectively, relative to 100 parts by mass of the component (a). Further preferably, the composition contains 0.001 to 5 parts by mass of (e) an onium salt relative to 100 parts by mass of the component (a).

12 Claims, No Drawings

ADHESIVE COMPOSITION

CROSS-REFERENCE TO RELATED APPLICATIONS

This application is a U.S. national phase application filed under 35 U.S.C. §371 of International Application No. PCT/JP2014/070934, filed Aug. 7, 2014, designating the United States, which claims priority from Japanese Patent Application No. 2013-182418, filed Sep. 3, 2013, and the complete disclosures of which applications are hereby incorporated herein by reference in their entirety for all purposes.

TECHNICAL FIELD

The present invention relates to an adhesive composition. More specifically, the present invention relates to an adhesive composition containing a 2-cyanoacrylic acid ester, which can form a cured product that is not only flexible, but also excellent in adhesion durability.

BACKGROUND ART

An adhesive composition containing a 2-cyanoacrylic acid ester quickly establishes a strong bonding among various types of materials attributed to the unique anion polymerization characteristics exhibited by its principal component, 2-cyanoacrylic acid ester, which initiates polymerization under the presence of weak anion provided by slight moisture or the like attached to a surface of an adherend. Accordingly, it is used as the so-called instantaneous adhesive in a wide range of fields including industrial, medical, and household applications. Because the cured product of this adhesive composition is hard and brittle, it exhibits excellent adhesion strength against shear; however, it is problematic in that peel adhesion strength and impact adhesion strength are low, and particularly cold/hot cycle resistance of the adhesion strength is inferior, particularly when it is applied between different types of adherends. Furthermore, in case of bonding flexible adherends, there is a problem of impairing the flexibility of the adherend.

To overcome these problems, modification methods have been proposed heretofore, which include adding various types of plasticizers and elastomers (see, for instance, Patent Documents 1, 2 and 3). Also proposed are methods of blending therein a poorly soluble rubber or elastomer particles (e.g., Patent Documents 4). Furthermore, also disclosed is an adhesion method using two types of adhesives, i.e., 2-cyanoacrylic acid ester and a moisture-curing adhesive at ordinary temperature, in which temporary fixation is quickly achieved and sufficiently high adhesion strength is established after certain lapse of time (e.g., Patent Document 5).

On the other hand, also known in the art is a method for improving the water-resistance of the adhesive by blending a monosilane compound or a bissilane compound in the 2-cyanoacrylic acid ester (e.g., Patent Document 6).

CONVENTIONAL TECHNICAL DOCUMENTS

Patent Documents

Patent Document 1: Japanese Patent Publication (Laid-open) No. H2-34678.
Patent Document 2: Japanese Patent Publication (Laid-open) No. H6-145605.
Patent Document 3: Japanese Patent Publication (Laid-open) No. H6-57214.
Patent Document 4: Japanese Patent Publication (Laid-open) No. H6-240209.
Patent Document 5: Japanese Patent Publication (Laid-open) No. S63-12677.
Patent Document 6: US Patent Publication 20130174981 specification.

SUMMARY OF INVENTION

Problems to be Solved by the Invention

Although the modification method disclosed in the aforementioned Patent Document 1 imparts flexibility to the adhesive, it is still unsatisfactory in that they cannot sufficiently improve the cold/hot cycle resistance of the adhesion strength, particularly when it is applied between different types of adherends, and that the adhesion strength decreases with the passage of time due to the bleeding out of the plasticizer from the adhesive. Further, the methods described in Patent Documents 2 to 4 are sometimes effective in improving the adhesion strength, but cured product is hard and the lack of flexibility still remains as a problem. Furthermore, the method disclosed in Patent Document 5 is not easy to use and is inferior in productivity because it utilizes a two-part adhesive. In addition, there is a problem in insufficient flexibility because the two-part liquids need to be applied separately to avoid mixing thereof. On the other hand, the adhesive composition disclosed in Patent Document 6 contains a silane compound, however, flexibility cannot be obtained for the cured product because the silane compound is a low-molecular weight compound.

The present invention has been made in light of the above described circumstances, and the objective thereof is to provide an adhesive composition containing a 2-cyanoacrylic acid ester, which is flexible and excellent in adhesion durability.

Means for Solving the Problems

The present inventors have made diligent studies for solving the aforementioned problems, and as a result, have found that an adhesive composition containing a 2-cyanoacrylic acid ester, a polymer having a hydrolyzable silyl group, an elastomer, and an acid catalyst in specific blending amounts thereof achieves a cured product having both flexibility and adhesion durability. Thus, the present invention has been accomplished.

That is, the present invention is as follows.

1. An adhesive composition which comprises (a) a 2-cyanoacrylic acid ester, (b) a polymer having a hydrolyzable silyl group, (c) an elastomer, and (d) an acid catalyst, in which the contents of the components (b), (c), and (d) are from 5 to 200 parts by mass, from 5 to 50 parts by mass, and from 0.0005 to 0.5 parts by mass, respectively, relative to 100 parts by mass of the component (a).

2. The adhesive composition according to the above item 1, wherein the main chain chemical structure of the polymer (b) having a hydrolyzable silyl group is at least one polymer selected from the group consisting of oxyalkylene polymer, vinyl polymer, polyester polymer, polyurethane polymer, and polycarbonate polymer.

3. The adhesive composition according to the above item 1 or item 2, wherein the polymer (b) having a hydrolyzable silyl group has a number average molecular weight of from 500 to 50,000.

4. The adhesive composition according to any one of the above items 1 to 3, wherein the elastomer (c) is a copolymer made from a monomer capable of forming a polymer poorly soluble to 2-cyanoacrylic acid ester and a monomer capable of forming a polymer soluble to 2-cyanoacrylic acid ester.

5. The adhesive composition according to any one of the above items 1 to 3, wherein the elastomer (c) is a copolymer made from a monomer capable of forming a polymer poorly soluble to 2-cyanoacrylic acid ester, a monomer capable of forming a polymer soluble to 2-cyanoacrylic acid ester, and a monomer containing a carboxyl group.

6. The adhesive composition according to the above item 4 or item 5, wherein the monomer capable of forming a polymer poorly soluble to 2-cyanoacrylic acid ester is at least one selected from ethylene, propylene, isoprene, and butadiene, and the monomer capable of forming a polymer soluble to 2-cyanoacrylic acid ester is at least one selected from acrylic acid esters and methacrylic acid esters.

7. The adhesive composition according to any one of the above items 1 to 6, wherein the acid catalyst (d) is an acid having a pKa of 4 or lower at 25° C.

8. The adhesive composition according to any one of the above items 1 to 7, wherein the acid catalyst (d) is at least one selected from the group consisting of sulfonic acid, phosphoric acid, phosphoric acid monoesters, phosphoric acid diesters, phosphorous acid, and phosphorous acid esters.

9. The adhesive composition according to any one of the above items 1 to 8, which further comprises an onium salt (e) represented by the following general formula (1):

wherein $C^+$ is an onium cation, and $A^-$ is a hydrogen sulfate anion, a hydrogen sulfite anion, a sulfonate anion represented by $R^1SO_3^-$ wherein $R^1$ represents an alkyl group, perfluoroalkyl group, cycloalkyl group, vinyl group, aryl group, perfluoroaryl group, aralkyl group or halogen atom; or a bis(substituted sulfonyl)imide anion represented by $(R^2SO_2)_2N^-$ wherein $R^2$ represents an alkyl group, perfluoroalkyl group, or aryl group; tetrafluoroborate anion, or hexafluorophosphate anion.

10. The adhesive composition according to the above item 9, wherein the cation of the onium salt (e) is at least one onium cation selected from the group consisting of quaternary ammonium cation, imidazolium cation, pyridinium cation, and tertiary sulfonium cation.

11. The adhesive composition according to the above item 9 or item 10, which contains the onium salt (e) in an amount of from 0.001 to 5 parts by mass, relative to 100 parts by mass of the 2-cyanoacrylic acid ester (a).

Effect of the Invention

The adhesive composition according to the present invention contains a 2-cyanoacrylic acid ester, a polymer having a hydrolyzable silyl group, an elastomer, and an acid catalyst in specific blending amounts thereof. Thus, the cured product exhibits flexibility and yet has excellent adhesion durability such as cold/hot cycle resistance and warm-water resistance.

When the adhesive composition further contains the onium salt represented by the above general formula (1), the adhesive composition exhibits excellent hardening properties and favorable storage stability.

DESCRIPTION OF EMBODIMENTS

Hereinafter, details of the adhesive composition according to the present invention will be described.

The adhesive composition according to the present invention comprises (a) a 2-cyanoacrylic acid ester, (b) a polymer having a hydrolyzable silyl group, (c) an elastomer, and (d) an acid catalyst in specific blending amounts thereof.

As the above-mentioned "(a) 2-cyanoacrylic acid ester", any 2-cyanoacrylic acid ester that has generally been used in this type of adhesive composition can be used without any limitation. The 2-cyanoacrylic acid ester of, for instance, methyl, ethyl, chloroethyl, n-propyl, i-propyl, allyl, propargyl, n-butyl, i-butyl, n-pentyl, n-hexyl, cyclohexyl, phenyl, tetrahydrofurfuryl, heptyl, 2-ethylhexyl, n-octyl, 2-octyl, n-nonyl, oxononyl, n-decyl, n-dodecyl, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, 2,2,2-trifluoroethyl, and hexafluoroisopropyl esters of 2-cyanoacrylic acid. Preferred among them from the viewpoint of obtaining adhesive compositions with imoproved hardening properties are 2-cyanoacrylic acid esters having an alkyl group containing from 1 to 4 carbon atoms, and particularly preferred are alkyl 2-cyanoacrylates having an alkyl group containing from 1 to 4 carbon atoms. These 2-cyanoacrylic acid esters may be used alone or in a combination of two or more thereof.

The adhesive composition according to the present invention comprises "(b) a polymer having a hydrolyzable silyl group". The polymer having a hydrolyzable silyl group increases the adhesion durability such as cold/hot cycle resistance and warm-water resistance of the adhesive. Furthermore, by adding the polymer, flexibility can be imparted to the adhesive composition.

The hydrolyzable silyl group contained in the above component (b) has a silicon atom and a hydroxyl group and/or a hydrolyzable functional group bonded to the silicon atom, which, upon hydrolysis, forms a siloxane bonding and a crosslinked structure. There is no particular limitation for the hydrolyzable silyl group, but preferred are the groups represented by the general formula (2) below:

wherein $R^{10}$ each independently represents a hydrocarbon group; X each independently represents a reactive group selected from halogen atom, hydrogen atom, hydroxyl group, an alkoxy group, an acyloxy group, a ketoximate group, an amide group, an acid amide group, a mercapto group, an alkenyloxy group, and an aminoxy group; and n is 0, 1, or 2.

In the above general formula (2), $R^{10}$ preferably is an alkyl group having from 1 to 20 carbon atoms, an aryl group having from 6 to 20 carbon atoms, or an aralkyl group having from 7 to 20 carbon atoms. When n is 2, plural $R^{10}$ groups may be the same or different. When n is 0 or 1, plural X groups may be the same or different. In the above general formula (2), X is preferably an alkoxy group.

Because the polymer of the above component (b) has a hydrolyzable silyl group, Si—O—Si bonds are established by hydrolytic condensation to form a cured body, such as a film, which exhibits excellent strength. In the above general formula (2), when X is an alkoxy group, the hydrolyzable silyl group is an alkoxysilyl group, such as trimethoxysilyl group, methyldimethoxysilyl group, dimethylmethoxysilyl group, triethoxysilyl group, methyldiethoxysilyl group, and methylbis(2-methoxyethoxy)silyl group. From the viewpoint of balanced setting rate and flexibility, particularly preferred among them are trimethoxysilyl group and methyldimethoxysilyl group.

The average number of the hydrolyzable silyl group per molecule of the above component (b) is preferably, 1 to 4, more preferably 1.5 to 3, from the viewpoint of adhesion properties and the flexibility of the cured body. If the number of the hydrolyzable silyl group is less than 1, the setting of the adhesive composition may become insufficient, and if it exceeds 4, the hardened product may become too stiff.

Furthermore, the position of the hydrolyzable silyl group contained in the above component (b) is not particularly limited, and may be located in side chains and/or at terminals of the polymer.

The main chain chemical structure of the above mentioned (b) polymer having a hydrolyzable silyl group is preferably at least one type of polymer selected from the group consisting of oxyalkylene-based polymer, vinyl-based polymer, polyester-based polymer, polyurethane-based polymer, and polycarbonate-based polymer. Among them, more preferred from the viewpoint of the flexibility of the cured product of the adhesive and the stability upon mixing with 2-cyanoacrylic acid ester are oxyalkylene-based polymer and vinyl-based polymer. The above polymer may be either a straight chain polymer or a branched polymer. It may also be a combination thereof.

The above oxyalkylene-based polymer is not particularly limited so long as it contains a repetition unit expressed by the general formula (3) below.

$$-O-R^{11}- \qquad (3)$$

In the above formula, $R^{11}$ represents a divalent hydrocarbon group.

As $R^{11}$ in the above general formula (3), there can be mentioned $-CH(CH_3)-CH_2-$, $-CH(C_2H_5)-CH_2-$, $-C(CH_3)_2-CH_2-$, $-CH_2CH_2CH_2CH_2-$, and the like. Preferred among them is $-CH(CH_3)-CH_2-$. The above oxyalkylene-based polymer may contain one type of the above repetition unit alone, or may contain two or more types in combination thereof.

The method of producing the above oxyalkylene-based polymer is not particularly limited, however, there can be mentioned a production method using an alkali catalyst such as KOH, a production method using a transition metal compound-porphyrin complex catalyst, a production method using complex-metal cyanide complex catalyst, a production method using phosphazene, and the like. Among these, the production method using complex-metal cyanide complex catalyst is suitable for obtaining polymers with high molecular weight and having a narrow molecular weight distribution. Furthermore, the use of this polymer is preferred to obtain an adhesive composition with excellent balance in viscosity and fracture elongation of the hardened product.

The above mentioned vinyl based polymers are not particularly limited so long as they result from polymerization of a vinyl monomer capable of causing radical polymerization. The vinyl-based monomers include (meth)acrylic acid based monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxypropyl (meth)acrylate, 2-hydroxyethyl (meth)acrylate, 2-hydroxypropyl (meth)acrylate, stearyl (meth)acrylate, ethylene oxide adducts of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadcylethyl (meth)acrylate; styrene-based monomers such as styrene, vinyltoluene, α-methylstyrene, chlorostyrene, styrenesulfonic acid and its salts, or the like; fluorine-containing vinyl monomers such as perfluoroethylene, perfluoropropylene, and vinyldene fluoride; maleic anhydride, maleic acid, and monoalkyl esters and dialkyl esters of maleic acid; fumaric acid and monoalkyl esters and dialkyl esters of fumaric acid; maleimide-based monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; a nitrile-group containing vinyl-based monomer such as acrylonitrile and methacrylonitrile; an amido-group containing vinyl-based monomer such as acrylamide and methacrylamide; a vinyl ester such as vinyl acetate, vinyl propionate, vinyl pivalate, vinyl benzoate and vinyl cinnamate; an alkene such as ethylene and propylene; a conjugate diene such as butadiene and isoprene; vinyl chloride, vinylidene chloride, allyl chloride and allyl alcohol. These can be used alone or in a combination of two or more thereof. In the above notation, for example, (meth)acrylic acid represents acrylic acid or methacrylic acid.

The vinyl-based polymer having a hydrolyzable silyl group can be produced by a method known in the art disclosed in, for instance, Japanese Patent Publication (Laid-open) No. S59-122541, Japanese Patent Publication (Laid-open) No. S60-31556, Japanese Patent Publication (Laid-open) No. S63-112642, and Japanese Patent Publication (Laid-open) No. H6-172631.

Further, as a polymer having a hydrolyzable silyl group, there can be used a graft copolymer having an alkoxysilyl group. Such a copolymer is disclosed in, for example, International Publication WO2007/023669.

Furthermore, the polymer having a hydrolyzable silyl group according to the present invention may contain a polar element portion in the molecule. The polar element portion herein refers to a urethane bond, thiourethane bond, urea bond, thiourea bond, substituted urea bond, substituted thiourea bond, amide bond, sulfide bond and the like. A method of manufacturing of this type of setting resin containing a polar element portion within the molecule is disclosed in, for example, Japanese Patent Publication (Laid-open) No. 2000-169544 and the like.

The number average molecular weight of the above polymer (b) having a hydrolyzablesilyl group is preferably in a range of from 500 to 50000, more preferably, from 1000 to 40000, and further preferably, from 3000 to 35000. So long as the number average molecular weight is in the range of from 500 to 50000, an adhesive composition whose hardened product exhibits favorable flexibility and excellent resistances to cold/hot cycles and warm water can be obtained.

The average molecular weight in the present invention was measured by gel permeation chromatography (hereinafter, simply referred to as "GPC"). The GPC measurement was carried out by using a polystyrene gel column with tetrahydrofuran as the mobile phase. The molecular weight was obtained as a polystyrene-converted value.

The content of the polymer having the hydrolyzable silyl group in the adhesive composition is in the range of from 5 to 200 parts by mass per 100 parts by mass of 2-cyanoacrylic acid ester. The content is, preferably, from 10 to 150 parts by mass, and more preferably, from 15 to 100 parts by mass. So long as the polymer content is in a range of from 5 to 200 parts by mass, an adhesive composition having excellent adhesion durability, such as cold/hot resistance and warm water resistance, can be obtained. Furthermore, it results in an adhesive composition with excellent flexibility.

The above "(c) elastomer" refers to a material having rubber elasticity around ordinary temperature (20° C.±15° C.), and is not particularly limited so long as it is a component soluble to both the (a) 2-cyanoacrylic acid ester and the (b) polymer having a hydrolyzable silyl group. The (a) 2-cyanoacrylic acid ester and the (b) polymer having a hydrolyzable silyl group are not compatible with each other, but the presence of the elastomer allows stable compatibility. The elastomer includes those selected from an acrylic acid ester-based copolymer, an acrylonitrile-styrene-based copolymer, an acrylonitrile-butadiene-based copolymer, an acrylonitrile-butadiene-styrene-based copolymer, a styrene-butadiene-based copolymer, a styrene-isoprene-based copolymer, an ethylene-acrylic acid ester-based copolymer, an ethylene-propylene-based copolymer, an ethylene-vinyl acetate-based copolymer, a polyurethane-based copolymer, a polyester-based copolymer, a fluorine-based copolymer, a polyisoprene-based copolymer, a chloroprene-based copolymer, or the like. They can be used alone or in a combination of two or more thereof.

Furthermore, preferred as the elastomer is a copolymer resulting from a monomer capable of forming a polymer poorly soluble in 2-cyanoacrylic acid ester and a monomer capable of forming a polymer soluble in 2-cyanoacrylic acid ester (except for the carboxyl-group containing monomers listed below). This copolymer comprises a poorly soluble segment formed by polymerization of the monomer capable of forming a polymer poorly soluble in 2-cyanoacrylic acid ester and a soluble segment formed by polymerization of the monomer capable of forming a polymer soluble in 2-cyanoacrylic acid ester.

The monomer capable of forming a polymer poorly soluble in 2-cyanoacrylic acid ester is not particularly limited, and examples thereof include ethylene, propylene, isoprene, butadiene, chloroprene, 1-hexene, cyclopentene, or the like. These monomers can be used alone or in a combination of two or more thereof. As the monomer for forming the poorly soluble polymer, often used are ethylene, propylene, isoprene, butadiene, and chloroprene; preferred is to use at least one selected from ethylene, propylene, isoprene, and butadiene.

The monomer capable of forming a polymer soluble in 2-cyanoacrylic acid ester also is not particularly limited, and examples thereof include acrylic acid esters, methacrylic acid esters, vinyl chloride, vinyl acetate, vinyl ether, styrene, acrylonitrile, or the like. Preferred is to use at least one of acrylic acid esters and methacrylic acid esters. Examples of the acrylic acid esters include methyl acrylate, ethyl acrylate, n-propyl acrylate, i-propyl acrylate, n-butyl acrylate, i-butyl acrylate, n-hexyl acrylate, n-heptyl acrylate, n-octyl acrylate, 2-ethylhexyl acrylate, methoxyethyl acrylate, methoxypropyl acrylate, ethoxyethyl acrylate, ethoxypropyl acrylate, or the like. These monomers can be used alone, or in a combination of two or more thereof.

Furthermore, examples of the methacrylic acid esters include methyl methacrylate, ethyl methacrylate, n-propyl methacrylate, i-propyl methacrylate, n-butyl methacrylate, i-butyl methacrylate, n-hexyl methacrylate, n-heptyl methacrylate, n-octyl methacrylate, 2-ethylhexyl methacrylate, methoxyethyl methacrylate, methoxypropyl methacrylate, ethoxyethyl methacrylate, ethoxypropyl methacrylate, or the like. These monomers can be used alone or in combination of two or more thereof. An acrylic acid ester and a methacrylic acid ester may be used in combination.

The proportion of the poorly soluble segment formed by polymerization of the monomer capable of forming a poorly soluble polymer and the soluble segment formed by polymerization of the monomer capable of forming a soluble polymer is not particularly limited so long as the poorly soluble segment accounts for 5 to 90 mol %, preferably 10 to 80 mol %, and the soluble segment accounts for 10 to 95 mol %, preferably 20 to 90 mol %, provided that the total of these segments is 100 mol %. More preferable proportion is from 30 to 80 mol % of the poorly soluble segment and from 20 to 70 mol % of the soluble segment; still preferable proportion is from 40 to 80 mol % of the poorly soluble segment and from 20 to 60 mol % of the soluble segment. Particularly preferable proportion is 50 to 75 mol % of the poorly soluble segment and from 25 to 50 mol % of the soluble segment. If the proportion of the poorly soluble segment is from 5 to 90 mol % and that of the soluble segment content is from 10 to 95 mol %, particularly, if the proportion of the poorly soluble segment is from 30 to 80 mol % and that of the soluble segment content is from 20 to 70 mol %, the copolymer can be properly dissolved in 2-cyanoacrylic acid ester to obtain an adhesive composition having excellent cold/hot cycle resistance in addition to high shear adhesion strength or the like.

The proportion of the respective segments can be calculated by integration values for proton measured by proton nuclear magnetic resonance spectroscopy (referred to hereinafter as "$^1$H-NMR").

Further, as particularly preferred for the above elastomers, there can be also mentioned a copolymer comprising a monomer capable of forming a polymer soluble in 2-cyanoacrylic acid ester, a monomer capable of forming a polymer poorly soluble in 2-cyanoacrylic acid ester, and a monomer containing a carboxyl group. In general, a small amount of the monomer containing a carboxyl group is added to the copolymer. The monomer containing a carboxyl group is not particularly limited, and examples include acrylic acid, methacrylic acid, maleic acid, fumaric acid, itaconic acid, crotonic acid, cinnamic acid, or the like. These monomers can be used alone or in a combination of two or more thereof. Frequently used as the monomer containing a carboxyl group are acrylic acid and methacrylic acid, which may be used alone or in combination thereof. The segment containing a carboxyl group, which is formed by polymerization of the monomer containing a carboxyl group, is a highly hydrophilic segment soluble in 2-cyanoacrylic acid ester. An adhesive composition having excellent adhesion durability can be obtained by using the copolymer having the carboxyl group.

The proportion of the segment containing a carboxyl group is not particularly limited, however, preferably, it is from 0.1 to 5 mol %, more preferably from 0.3 to 4 mol %, and further preferably from 0.4 to 3 mol %, provided that the poorly soluble segment, the soluble segment, and the segment containing a carboxyl group, in total makes 100 mol %. The proportion is further preferably from 0.5 to 2.5 mol %, and particularly preferably, from 0.5 to 2.3 mol %. So long as the segment containing a carboxyl group is contained in a range of from 0.1 to 5 mol %, particularly preferably from 0.5 to 2.5 mol %, an adhesive composition can be provided, which quickly hardens after application to adherends and exhibits excellent cold/hot cycle resistance in combination with resistance to warm water.

The proportion of the segment containing a carboxyl group can be measured by potentiometric titration or by indicator titration in accordance with JIS K 0070.

Examples of the copolymer include an ethylene-methyl acrylate copolymer, an ethylene-methyl acrylate-butyl acrylate copolymer, an ethylene-methyl methacrylate copolymer, an ethylene-vinyl acetate copolymer, a butadiene-methyl acrylate copolymer, a butadiene-acrylonitrile copolymer, a butadiene-acrylonitrile-acrylic acid ester copolymer, and a butadiene-styrene-acrylonitrile-methyl acrylate copolymer. Particularly preferred copolymers among them are an ethylene-methyl acrylate copolymer and an ethylene-methyl acrylate-butyl acrylate copolymer. A copolymer resulting from polymerization of monomers used in the above respective copolymers with a monomer containing a carboxyl group, such as acrylic acid and/or methacrylic acid, is also usable. These copolymers may be used alone or in a combination of two or more thereof, or a copolymer free of the monomer containing a carboxyl group may be used in combination with a copolymer using the monomer containing a carboxyl group.

The average molecular weight of the elastomer is not particularly limited, however, the number average molecular weight (Mn) is preferably in a range of from 5000 to 500000, particularly preferably from 15000 to 150000, and further preferably from 20000 to 100000. So long as the high molecular-weight component has a number average molecular weight in the range of from 5000 to 500000, the high molecular-weight component easily dissolves in 2-cyanoacrylic acid ester, and particularly, an adhesive composition maintaining high adhesion strength after the cold/hot cycle resistance test can be obtained. Further, the weight average molecular weight (Mw) of the high molecular-weight component is preferably in a range of from 5000 to 1000000, particularly from 10000 to 1000000, and Mw/Mn is preferably in a range of from 1.00 to 10.0, and particularly from 1.00 to 8.0.

The content of the elastomer in the adhesive composition is preferably in the range of from 5 to 50 parts by mass per 100 parts by mass of 2-cyanoacrylic acid ester. Although depending on the type of the 2-cyanoacrylic acid ester and the polymer having a hydrolyzable silyl group, the content of the elastomer is more preferably from 10 to 45 parts by mass, and particularly preferably from 15 to 40 parts by mass. So long as the content of the elastomer is in the range of from 5 to 50 parts by mass, stable compatibility can be established between the 2-cyanoacrylic acid ester and the polymer having a hydrolyzable silyl group, thereby resulting in an adhesive composition exhibiting an excellent adhesion function.

The aforementioned "(d) acid catalyst" is a curing catalyst for the above (b) polymer having a hydrolyzable silyl group. Preferred as the acid catalyst is an acid having pKa value at 25° C. of 4 or lower. More preferably, the pKa value is 3.0 or lower. An acid having a pKa value of 4 or lower enables the adhesive composition to cure of at a rate suitable for practical use. Specific examples of the acid catalysts include sulfonic acid, phosphoric acid, phosphoric acid monoester, phosphoric acid diester, phosphorous acid, phosphorous acid ester, and the like. Among them, preferred from hardening properties are sulfonic acid, phosphoric acid, phosphoric acid monoester, and phosphoric acid diester.

The content of the acid catalyst in the adhesive composition is from 0.0005 to 0.5 parts by mass per 100 parts by mass of 2-cyanoacrylic acid ester. Preferably, the content of the acid catalyst is from 0.001 to 0.4 parts by mass, and more preferably from 0.0015 to 0.3 parts by mass. So long as the content of the acid catalyst is in the range of from 0.0005 to 0.5 parts by mass, favorable hardening properties can be achieved, without reversely affecting the storage stability of the adhesive composition.

The adhesive composition according to the present invention may contain, in addition to the above components (a) to (d), "(e) an onium salt represented by the following general formula (1)". The onium salt accelerates the hardening of the adhesive composition and improves the storage stability thereof.

wherein, $C^+$ represents an onium cation and $A^-$ represents hydrogen sulfate anion, hydrogen bisulfite anion, a sulfonate anion represented by $R^1SO_3^-$ (where $R^1$ is an alkyl group, perfluoroalkyl, cycloalkyl group, vinyl group, aryl group, perfluoroaryl group, aralkyl group, or halogen atom), a bis(substituted sulfonyl)imide anion represented by $(R^2SO_2)_2N^-$ (where $R^2$ is an alkyl group, perfluoroalkyl group, or aryl group), tetrafluoroboron anion, or a hexafluorophosphate anion.

The cations of the onium salt above include an onium cation represented by the following general formula (4), an imidazolium cation, a pyridinium cation, and an onium cation represented by the following general formula (5):

wherein $R^3$ to $R^6$ each independently represents a non-substituted or substituted alkyl group having from 1 to 20 carbon atoms, cycloalkyl group, aryl group, aralkyl group, alkenyl group or alkynyl group; otherwise, part or all of $R^3$ to $R^6$ may forma non-substituted or substituted 3 to 10 membered ring together with the atom represented by A wherein the ring may contain a hetero atom such as O and S, provided that $R^3$ to $R^6$ which do not involve the formation of the ring are the same as defined hereinbefore; and A represents a nitrogen atom or phosphorus atom. Specific examples of the above substituted alkyl group include, for example, an alkoxy group and an alkanoyl group. When part of $R^3$ to $R^6$ form a ring, the ring is, in general, constituted by 2 to 3 of $R^3$ to $R^6$. Specific examples of the compound represented by the formula (4) in which two of $R^3$ to $R^6$ form a ring include piperidinium cation, morpholinium cation, and pyrrolidinium cation.

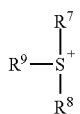

(5)

wherein $R^7$ to $R^9$ each independently represents a non-substituted or substituted alkyl group having from 1 to 20 carbon atoms, cycloalkyl group, aryl group, aralkyl group, alkenyl group or alkynyl group; otherwise, part or all of $R^7$ to $R^9$ may form a non-substituted or substituted 3 to 10 membered ring together with the sulfur atom wherein the ring may contain a hetero atom such as O and S, provided that $R^7$ to $R^9$ which do not involve the formation of the ring are the same as defined hereinbefore. Specific examples of the above substituted alkyl group include, for example, an alkoxy group and an alkanoyl group.

Representative examples of the onium cations represented by the general formula (4) include a quaternary ammonium cation, a quaternary phosphonium cation, and the like.

Specific examples of the quaternary ammonium cations include tetraalkylammonium cations such as tetramethylammonium, ethyltrimethylammonium, diethyldimethylammonium, triethylmethylammonium, tetraethylammonium, tetra-n-butylammonium, trimethyl-n-propylammonium, isopropyl-trimethylammonium, n-butyltrimethylammonium, isobutyltrimethylammonium, t-butyltrimethylammonium, n-hexyltrimethylammonium, dimethyldi-n-propylammonium, dimethyldi-isopropylammonium, isopropyldimethyl-n-propylammonium, methyltri-n-propylammonium, tri-isopropylmethylammonium, isopropylmethyldi-n-propylammonium, methyl-n-propyldiisopropylammonium, triethyl-n-propylammonium, triethylisopropylammonium, n-butyltriethylammonium, triethylisobutylammonium, t-butyltriethylammonium, di-n-butyldimethylammonium, diisobutyldimethylammonium, di-t-butyldimethylammonium, n-butylethyldimethylammonium, isobutylethyldimethylammonium, t-butylethyldimethylammonium, n-butyl-isobutyldimethylammonium, n-butyl-t-butyldimethylammonium, t-butylisobutyldimethylammonium, diethyldi-n-propylammonium, diethyldiisopropylammonium, diethylisopropyl-n-propylammonium, ethyltri-n-propylammonium, ethyltriisopropylammonium, ethylisopropyldi-n-propylammonium, ethyldiisopropyl-n-propylammonium, diethylmethyl-n-propylammonium, ethyldimethyl-n-propylammonium, ethylmethyldi-n-propylammonium, diethylisopropylmethylammonium, ethylisopropyldimethylammonium, ethyldiisopropylmethylammonium, ethylmethyl-n-propylisopropylammonium, tetra-n-propylammonium, tetra-isopropylammonium, tri-isopropyl-n-propylammonium, diisopropyldi-n-propylammonium, isopropyl-tri-n-propylammonium, butyltrimethylammonium, trimethylpentylammonium, hexyltrimethylammonium, heptyltrimethylammonium, trimethyloctylammonium, trimethylnonylammonium, decyltrimethylammonium, trimethylundecylammonium, dodecyltrimethylammonium, didecyldimethylammonium, dilauryldimethylammonium, dimethyldistyrylammonium, dimethyldioctadecylammonium, dimethyldioctylammonium, dimethyldipalmitylammonium, ethylhexadecyldimethylammonium, hexyldimethyloctylammonium, dodecyl(ferrocenylmethyl)dimethylammonium and N-methylhomatropinium; an aromatic alkyl group substituted ammonium cation such as benzyltrimethylammonium, benzyltributylammonium and benzyldodecyldimethylammonium; an aromatic substituted ammonium cation such as trimethylphenylammonium and tetraphenylammonium; and aliphatic cyclic ammonium cations such as pyrrolidinium (such as 1,1-dimethylpyrrolidinium, 1-ethyl-1-methylpyrrolidinium, 1,1-diethylpyrrolidinium, 1,1-tetramethylenepyrrolidinium, and 1-butyl-1-methylpyrrolidinium), piperidinium (such as 1,1-dimethylpiperidinium, 1-ethyl-1-methylpiperidinium, 1,1-diethylpiperidinium, and 1-butyl-1-methylpiperidinium), and morpholinium (such as 1,1-dimethylmorpholinium, 1-ethyl-1-methylmorpholinium, and 1,1-diethylmorpholinium).

Specific examples of the quaternary phosphonium cations include cations such as tetramethylphosphonium, triethylmethylphosphonium, and tetraethylphosphonium.

Specific examples of the imidazolium cations include cations such as 1,3-dimethylimidazolium, 1,2,3-trimethylimidazolium, 1-ethyl-3-methylimidazolium, 1-ethyl-2,3-dimethylimidazolium, 1-methyl-3-n-octylimidazolium, 1-hexyl-3-methylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-n-butyl-2,3-methylimidazolium, 1,2,4-trimethyl-3-n-propylimidazolium, 1,2,3,4-tetramethylimidazolium, 1,2,3,4,5-pentamethylimidazolium, 2-ethyl-1,3-dimethylimidazolium, 1,3-dimethyl-2-n-propylimidazolium, 1,3-dimethyl-2-n-pentylimidazolium, 2-n-heptyl-1,3-dimethylimidazolium, 1,3,4-trimethylimidazolium, 2-ethyl-1,3,4-trimethylimidazolium, 1,3-dimethylbenzimidazolium, 3-methyl-1-phenylimidazolium, 1-benzyl-3-methylimidazolium, 2,3-dimethyl-1-phenylimidazolium, 1-benzyl-2,3-dimethylimidazolium, 1,3-dimethyl-2-phenylimidazolium, 2-benzyl-1,3-dimethylimidazolium, 1,3-dimethyl-2-n-undecylimidazolium, and 1,3-dimethyl-2-n-heptadecylimidazolium.

The pyridinium cations include cations such as 1-methylpyridinium, 1-ethylpyridinium, 1-n-propylpyridinium, 1-isopropylpyridinium, 1-n-butylpyridinium, and 1-n-butyl-3-methylpyridinium.

Specific examples of the tertiary sulfonium cations represented by the general formula (5) above include cations such as trimethylsulfonium, triethylsulfonium, tripropylsulfonium, and triphenylsulfonium.

Among the aforementioned onium cations, preferred are quaternary ammonium cations, imidazolium cations, pyridinium cations, or tertiary sulfonium cations from the viewpoint of exhibiting excellent solubility in 2-cyanoacrylic acid ester and good balance between high curing acceleration property and storage stability of the adhesive composition; and further preferred are quaternary ammonium cations, imidazolium cations, or pyridinium cations.

The anion of the aforementioned onium salt is hydrogen sulfate anion, hydrogen bisulfite anion, a sulfonate anion represented by $R^1SO_3^-$ (where $R^1$ is an alkyl group, perfluoroalkyl group, cycloalkylgroup, vinylgroup, arylgroup, perfluoroaryl group, aralkyl group, or halogen atom), a bis(substituted sulfonyl)imide anion represented by $R^2SO_2)_2N^-$ (where $R^2$ is an alkyl group, perfluoroalkyl group, or aryl group), tetrafluoroboron anion, or hexafluorophosphate anion. Preferably, the alkyl group represented by $R^1$ or $R^2$ contains from 1 to 15 carbon atoms.

Specific examples of the aforementioned sulfonate anions represented by $R^1SO_3^-$ include anions such as methanesulfonate, ethanesulfonate, propanesulfonate, hexanesulfonate, heptanesulfonate, octanesulfonate, dodecanesulfonate, vinylsulfonate, benzenesulfonate, p-toluenesulfonate, dodecylbenzenesulfonate, 10-camphorsulfonate, pentafluorobenzenesulfonate, fluorosulfonate, chlorosulfonate, and bromosulfonate. The perfluoroalkylsulfonate anions include anion such as trifluoromethanesulfonate anion and perfluorooctanesulfonate anion. The perfluoroalkyl group should have from 1 to 10 carbon atoms, preferably from 1 to 8 carbon atoms, from the viewpoint of solubility of the corresponding onium salt in 2-cyanoacrylic acid ester.

Specific examples of the aforementioned bis(substituted sulfonyl)imide anion represented by $(R^2SO_2)_2N^-$ include bis(methanesulfonyl)imide anion, bis(ethanesulfonyl)imide anion, bis(propanesulfonyl)imide anion, bis(trifluoromethanesulfonyl)imide anion, bis(pentafluoroethanesulfonyl)imide anion, bis(heptafluoropropanesulfonyl)imide anion, and bis(nonafluorobutanesulfonyl)imide anion.

Among these anions, preferred are hydrogen sulfate anions, perfluoroalkylsulfonate anions, and bis(perfluoroalkane sulfonyl)imide anions, and particularly preferred are perfluoroalkylsulfonate anions and bis(perfluoroalkane sulfonyl)imide anions, from the viewpoint of exhibiting excellent adhesion rate to metals and plastics and of imparting excellent storage stability to the adhesive composition.

Furthermore, in case the outer appearance of the cured adhesive product is problematic, preferred are hydrogen sulfate anion, hydrogen bisulfite anion, or a sulfonate anion represented by $R^1SO_3^-$ (where $R^1$ is an alkyl group, cycloalkyl group, aryl group, or aralkyl group), from the viewpoint of avoiding clouding of the cured product and exhibiting excellent curing rate.

The onium salt used in the present invention is not particularly limited so long as it is a combination of the cations and anions described hereinbefore. Specific examples of the onium salts include tetraethylammonium hydrogensulfate, tetra-n-butylammonium hydrogensulfate, methyltri-n-octyl ammonium hydrogensulfate, amyltriethylammonium hydrogensulfate, cyclohexyltrimethylammonium hydrogensulfate, 1-ethyl-3-methylimidazolium hydrogensulfate, 1-ethyl-2,3-dimethylimidazolium hydrogensulfate, 1-butyl-3-methylimidazolium hydrogensulfate, 1-butyl-2,3-dimethylimidazolium hydrogensulfate, 1-methyl-3-n-octylimidazolium hydrogensulfate, 1-hexyl-3-methylimidazolium hydrogensulfate, 2-ethyl-1,3-dimethylimidazolium hydrogensulfate, 1,3-dimethyl-2-n-propylimidazolium hydrogensulfate, 1,3-dimethyl-2-n-pentylimidazolium hydrogensulfate, 1,3-dimethyl-2-n-heptylimidazolium hydrogensulfate, 1-ethyl-1-methylpiperidinium hydrogensulfate, 1-butyl-1-methylpiperidinium hydrogensulfate, 1-ethyl-1-methylpyrrolidinium hydrogensulfate, 1-butyl-1-methylpyrrolidinium hydrogensulfate, 1-methyl-1-propylpyrrolidinium hydrogensulfate, 1-ethylpyridinium hydrogensulfate, 1-ethyl-3-methylpyridinium hydrogensulfate, 1-butyl-3-methylpyridinium hydrogensulfate, 1-ethyl-4-methylpyridinium hydrogensulfate, 1-butylpyridinium hydrogensulfate, 1-butyl-4-methylpyridinium hydrogensulfate, tetramethylphosphonium hydrogensulfate, triethylmethylphosphonium hydrogensulfate, tetraethylphosphonium hydrogensulfate, tetra-n-butylammonium methanesulfonate, methyltri-n-octylammonium methanesulfonate, 1-ethyl-3-methylimidazolium methanesulfonate, 1-ethyl-2,3-dimethylimidazolium methanesulfonate, 1-butyl-3-methylimidazolium methanesulfonate, 1-butyl-2,3-dimethylimidazolium methanesulfonate, 1-ethyl-1-methylpiperidinium methanesulfonate, 1-butyl-1-methylpiperidinium methanesulfonate, 1-ethyl-1-methylpyrrolidinium methanesulfonate, 1-butyl-1-methylpyrrolidinium methanesulfonate, 1-methyl-1-propylpyrrolidinium methanesulfonate, 1-ethylpyridinium methanesulfonate, 1-ethyl-3-methylpyridinium methanesulfonate, 1-butyl-3-methylpyridinium methanesulfonate, tetraethylphosphonium methanesulfonate, tetra-n-butylammonium p-toluenesulfonate, methyltri-n-octylammonium p-toluenesulfonate, 1-ethyl-3-methylimidazolium p-toluenesulfonate, 1-ethyl-2,3-dimethylimidazolium p-toluenesulfonate, 1-butyl-3-methylimidazolium p-toluenesulfonate, 1-butyl-2,3-dimethylimidazolium p-toluenesulfonate, 1-ethyl-1-methylpiperidinium p-toluenesulfonate, 1-butyl-1-methylpiperidinium p-toluenesulfonate, 1-ethyl-1-methylpyrrolidinium p-toluenesulfonate, 1-butyl-1-methylpyrrolidinium p-toluenesulfonate, 1-methyl-1-propylpyrrolidinium p-toluenesulfonate, 1-ethylpyridinium p-toluenesulfonate, 1-ethyl-3-methylpyridinium p-toluenesulfonate, 1-butyl-3-methylpyridinium p-toluenesulfonate, tetraethylphosphonium p-toluenesulfonate, tetraethylammonium trifluoromethanesulfonate, tetra-n-butylammonium trifluoromethanesulfonate, methyltri-n-butylammonium trifluoromethanesulfonate, methyltri-n-octylammonium trifluoromethanesulfonate, amyltriethylammonium trifluoromethanesulfonate, cyclohexyltrimethylammonium trifluoromethanesulfonate, benzyltributylammonium trifluoromethanesulfonate, benzyldodecyldimethylammonium trifluoromethanesulfonate, didecyldimethylammonium trifluoromethanesulfonate, dilauryldimethylammonium trifluoromethanesulfonate, hexyldimethyloctylammonium trifluoromethanesulfonate, dodecyl(ferrocenylmethyl)dimethylammonium trifluoromethanesulfonate, 1-ethyl-3-methylimidazolium trifluoromethanesulfonate, 1-ethyl-2,3-dimethylimidazolium trifluoromethanesulfonate, 1-butyl-3-methylimidazolium trifluoromethanesulfonate, 1-butyl-2,3-dimethylimidazolium trifluoromethanesulfonate, 1-methyl-3-n-octylimidazolium trifluoromethanesulfonate, 1-hexyl-3-methylimidazolium trifluoromethanesulfonate, 2-ethyl-1,3-dimethylimidazolium trifluoromethanesulfonate, 1,3-dimethyl-2-n-propylimidazolium trifluoromethanesulfonate, 1,3-dimethyl-2-n-pentylimidazolium trifluoromethanesulfonate, 1,3-dimethyl-2-n-heptylimidazolium trifluoromethanesulfonate, 1-ethyl-1-methylpiperidinium trifluoromethanesulfonate, 1-butyl-1-methylpiperidinium trifluoromethanesulfonate, 1-ethyl-1-methylpyrrolidinium trifluoromethanesulfonate, 1-butyl-1-methylpyrrolidinium trifluoromethanesulfonate, 1-methyl-1-propylpyrrolidinium trifluoromethanesulfonate, 1-ethylpyridinium trifluoromethanesulfonate, 1-ethyl-3-methylpyridinium trifluoromethanesulfonate, 1-butyl-3-methylpyridinium trifluoromethanesulfonate, 1-ethyl-4-methylpyridinium trifluoromethanesulfonate, 1-butylpyridinium trifluoromethanesulfonate, 1-butyl-4-methylpyridinium trifluoromethanesulfonate, tetramethylphosphonium trifluoromethanesulfonate, triethylmethylphosphonium trifluoromethanesulfonate, tetraethylphosphonium trifluoromethanesulfonate, tetraethylammonium bis(trifluoromethanesulfonyl)imide, tetra-n-butylammonium bis(trifluoromethanesulfonyl)imide, methyltri-n-octylammonium bis(trifluoromethanesulfonyl)imide, 1-ethyl-3-methylimidazolium bis(trifluoromethanesulfonyl)imide, 1-ethyl-2,3-dimethylimidazolium bis(trifluoromethanesulfonyl)imide, 1-butyl-3-methylimidazolium bis(trifluoromethanesulfonyl)imide, 1-butyl-2,3-dimethylimidazolium bis(trifluoromethanesulfonyl)imide, 1-ethyl-1-methylpiperidinium bis(trifluoromethanesulfonyl)imide, 1-butyl-1-methylpiperidinium bis(trifluoromethanesulfonyl)imide, 1-ethyl-1-methylpyrrolidinium bis(trifluoromethanesulfonyl)imide, 1-butyl-1-methylpyrrolidinium bis(trifluoromethanesulfonyl)imide, 1-methyl-1-propylpyrrolidinium bis(trifluoromethanesulfonyl)imide, 1-ethylpyridinium bis(trifluoromethanesulfonyl)

imide, 1-ethyl-3-methylpyridinium bis(trifluoromethanesulfonyl)imide, 1-butyl-3-methylpyridinium bis(trifluoromethanesulfonyl)imide, triethylsulfonium bis(trifluoromethanesulfonyl)imide, tetrabutylammonium tetrafluoroborate, 1-ethyl-3-methylimidazolium tetrafluoroborate, tetarbutylammonium hexafluorophosphate and 1-butyl-3-methylimidazolium hexafluorophosphate.

The onium salt according to the present invention can be obtained by methods known in the art. For instance, they can be prepared from the corresponding onium halides as described in, Hiroyuki Ohno et al., J. Am. Chem. Soc., 2005, 27, 2398-2399; or in Peter Wasserscheid et al., Green Chemistry, 2002, 4, 134-138.

The content of the aforementioned (e) onium salt in the adhesive composition is, preferably from 0.001 to 5 parts by mass, more preferably from 0.005 to 3 parts by mass, and further preferably from 0.01 to 2 parts by mass, per 100 parts by mass of 2-cyanoacrylic acid ester (a). So long as the content of the onium salt is in the range of from 0.001 to 5 parts by mass, it functions as a curing accelerator without impairing the storage stability of the adhesive composition.

As described hereinbefore, the adhesive composition according to the present invention contains the components (a) to (e), and when polymerizing (a) 2-cyanoacrylic acid ester and (b) polymer having a hydrolyzable silyl group, the (a) 2-cyanoacrylic acid ester, the (b) polymer having a hydrolyzable silyl group, and the (c) elastomer component undergo phase separation to form a sea-island structure comprising the polymerization product of the (a) 2-cyanoacrylic acid ester as the dispersed phase, and the (b) polymer having a hydrolyzable silyl group with the (c) elastomer component as the continuous phase. At this time, the (b) polymer having a hydrolyzable silyl group forms a three-dimensional crosslinking to fix the polymerized product of the (a) 2-cyanoacrylic acid ester as the dispersed phase even after the adhesion durability test. Thus, by fixing the sea-island structure, high adhesion strength can be maintained after durability tests such as heat resistance test, heat and humidity resistant test, warm water resistance test, and cold/hot cycle resistance test. Furthermore, a flexible hardened product is obtained as the hardened product of the adhesive.

The adhesive composition according to the present invention may contain a silane coupling agent to improve adhesion properties and storage stability. Silane coupling agents well known in the art can be widely used for this purpose; for instance, acrylic silanes such as γ-acryloxypropyltrimethoxysilane, γ-acryloxypropyltriethoxysilane, γ-acryloxypropyldimethoxysilane, and γ-acryloxypropyldiethoxysilane; mercaptosilanes such as γ-mercptopropyltrimethoxysilane and γ-mercaptopropyltriethoxysilane; γ-ureidoypropyltriethoxysilane, methyltrimethoxysilane, vinyltrimethoxysilane, or the like. These silane coupling agents may be used either alone or in combination of two or more thereof. Preferred among these silane coupling agents is vinyltrimethoxysilane from the viewpoint of storage stability. The content of the silane coupling agent is preferably in the range of from 0.1 to 20 parts by mass, and more preferably from 2 to 10 parts by mass, per 100 parts by mass of the (b) polymer having a hydrolyzable silyl group. Preferably, the content of the silane coupling agent is in the range of from 0.1 to 20 parts by mass, because high adhesion properties and sufficient storage stability can be obtained.

In addition to the aforementioned components, the adhesive composition according to the present invention may contain anion polymerization accelerators, stabilizers, plasticizers, thickeners, fumed silica, particles, fillers, colorants, fragrances, solvents, strength improvers and the like which have conventionally been blended in the adhesive compositions containing a 2-cyanoacrylic acid ester, according to purposes and in proper quantities within the ranges that do not impair curability, adhesion strength or the like.

Examples of the anion polymerization accelerators include polyalkylene oxides, crown ethers, silacrown ethers, calixarenes, cyclodextrins, and pyrogallol-based cyclic compounds. The polyalkylene oxides refer to polyalkylene oxides and the derivatives thereof, and examples thereof include those disclosed in Japanese Patent Publication (Kokoku) No. S60-37836, Japanese Patent Publication (Kokoku) No. H1-43790, Japanese Patent Publication (Laid-Open) No. S63-128088, Japanese Patent Publication (Laid-Open) No. H3-167279, U.S. Pat. Nos. 4,386,193, and 4,424,327. Concrete examples thereof include (1) polyalkylene oxides such as diethylene glycol, triethylene glycol, polyethylene glycol, and polypropylene glycol; and (2) derivatives of polyalkylene oxides such as polyethylene glycol monoalkyl esters, polyethylene glycol dialkyl esters, polypropylene glycol dialkyl esters, diethylene glycol monoalkyl ethers, diethylene glycol dialkyl ethers, dipropylene glycol monoalkyl ethers, and dipropylene glycol dialkyl ethers. Examples of the crown ethers include those disclosed in, for instance, Japanese Patent Publication (Kokoku) No. S55-2236 and Japanese Patent Publication (Laid-Open) No. H3-167279. Concrete examples thereof include 12-crown-4, 15-crown-5, 18-crown-6, benzo-12-crown-4, benzo-15-crown-5, benzo-18-crown-6, dibenzo-18-crown-6, dibenzo-24-crown-8, dibenzo-30-crown-10, tribenzo-18-crown-6, asym-dibenzo-22-crown-6, dibenzo-14-crown-4, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-tert-butyl-18-crown-6, and 1,2-vinylbenzo-15-crown-5. Examples of the silacrown ethers include, for example, those disclosed in Japanese Patent Publication (Laid-Open) No. S60-168775. Concrete examples thereof include dimethylsila-11-crown-4, dimethylsila-14-crown-5, and dimethylsila-17-crown-6. Examples of the calixarenes include those disclosed in Japanese Patent Publication (Laid-Open) No. S60-179482, Japanese Patent Publication (Laid-Open) No. S62-235379, and Japanese Patent Publication (Laid-Open) No. S63-88152. Concrete examples thereof include 5,11,17,23,29,35-hexa-tert-butyl-37,38,39,40,41,42-hexahydr oxycalix[6]arene, 37,38,39,40,41,42-hexahydroxycalix[6]arene, 37,38,39,40,41,42-hexa-(2-oxo-2-ethoxy)-ethoxycalix[6]arene, 25,26,27,28-tetra-(2-oxo-2-ethoxy)-ethoxycalix[4]arene, and tetrakis(4-t-butyl-2-methylenephenoxy)ethyl acetate. Examples of the cyclodextrins include those disclosed in Japanese Patent Publication (Kohyo) No. H5-505835. Concrete examples thereof include α-, β-, or γ-cyclodextrins. Examples of the pyrogallol-based cyclic compounds include compounds disclosed in Japanese Patent Publication (Laid-Open) No. 2000-191600. Concrete examples thereof include 3,4,5,10,11,12,17,18,19,24,25,26-dodecaethoxycarbomethoxy-C-1,C-8,C-15,C-22-tetramethyl[14]-metacyclophane. These anion polymerization accelerators may be used alone or in combination of two or more thereof.

The stabilizers include (1) anion polymerization inhibitors, such as sulfur dioxide, aliphatic sulfonates such as methanesulfonate, aromatic sulfonates such as p-toluenesulfonate, boron trifluoride complexes such as boron trifluoride methanol and boron trifluoride diethyl ether, $HBF_4$, and trialkyl borate; and (2) radical polymerization inhibitors such as hydroquinone, hydroquinone monomethyl ether, t-butylcatechol, catechol, and pyrogallol. These stabilizers may be used alone, or in a combination of two or more thereof.

A plasticizer may be incorporated so long as the effect of the invention is not impaired; in particular, when the elastomer component is constituted by a copolymer resulting from a larger amount of monomers capable of forming the poorly soluble polymers, i.e., a copolymer containing a larger amount of the poorly soluble segments (a copolymer containing 65 mol % or more of the poorly soluble segments), the addition of the plasticizer in a proper quantity improves the solubility thereof. The plasticizer includes triethyl acetyl citrate, tributyl acetyl citrate, dimethyl adipate, diethyl adipate, dimethyl sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphorate, 2-ethylhexylcyclohexyl carboxylate, diisobutyl fumarate, diisobutyl maleate, caproic triglyceride, 2-ethylhexyl benzoate, and dipropylene glycol dibenzoate. Among them, preferred from the viewpoint of good compatibility with 2-cyanoacrylic acid ester and of high plasticizing efficiency are tributyl acetyl citrate, dimethyl adipate, dimethyl phthalate, 2-ethylhexyl benzoate, and dipropylene glycol dibenzoate. These plasticizers may be used alone or in combination of two or more thereof. The content of the plasticizers is not particularly limited, however, the range thereof is preferably from 3 to 50 parts by mass, particularly preferably from 10 to 45 parts by mass, and further preferably from 20 to 40 parts by mass per 100 parts by mass of 2-cyanoacrylic acid ester. So long as the content of the plasticizer is in a range of from 3 to 50 parts by mass, and especially when the copolymer is such containing the poorly soluble segments in a larger quantity, the copolymer can be easily dissolved in 2-cyanoacrylic acid ester, and particularly, the retention rate of the adhesive strength after cold/hot cycle resistance test can be improved.

Further, the thickeners include polymethyl methacrylates, copolymers of methyl methacrylate and an acrylate, copolymers of methyl methacrylate and another methacrylate, acrylic rubbers, polyvinylchloride, polystyrene, cellulose esters, polyalkyl-2-cyanoacrylate, and ethylene-vinyl acetate copolymers. These thickeners may be used alone or in combination of two or more thereof.

The adhesive composition may contain fumed silica. The fumed silica refers to ultrafine anhydrous silica (having a primary particle size of 500 nm or smaller, particularly from 1 to 200 nm). This anhydrous silica is ultrafine anhydrous silica (having a primary particle size of 500 nm or smaller, particularly from 1 to 200 nm) which is obtained by, for example, oxidizing silicon tetrachloride as a starting material in gas phase under a high temperature flame, and includes two types of silica, namely, hydrophilic silica which has highly hydrophilic, and hydrophobic silica which has highly hydrophobic. Either of the fumed silica is usable, however, preferred is hydrophobic silica from the viewpoint of dispersibility in 2-cyanoacrylic acid esters and copolymers. Furthermore, it is preferred that a hydrophilic silica is used in combination when the elastomer component is constituted by a copolymer resulting from a larger amount of monomers capable of forming polymers soluble in 2-cyanoacrylic acid ester, i.e., a copolymer containing a larger amount of the soluble segments (which include segments containing a carboxyl group), while a hydrophobic silica is used in combination when the high molecular-weight component is constituted by a copolymer resulting from a larger amount of monomers capable of forming polymers poorly soluble in 2-cyanoacrylic acid ester, i.e., a copolymer containing a larger amount of the poorly soluble segments.

Various types of commercially available hydrophilic silica products can be used; such as Aerosil 50, 130, 200, 300, and 380 (trade names, manufactured by Nippon Aerosil Co., Ltd.). The specific surface areas of the above hydrophilic silicas are $50\pm15$ $m^2/g$, $130\pm25$ $m^2/g$, $200\pm25$ $m^2/g$, $300\pm30$ $m^2/g$, and $380\pm30$ $m^2/g$, respectively. Another usable commercially available hydrophilic silica products include REOLOSIL QS-10, QS-20, QS-30, QS-40 (trade names, manufactured by Tokuyama Corporation), and the like. These hydrophilic silicas have a specific surface area of $140\pm20$ $m^2/g$, $220\pm20$ $m^2/g$, $300\pm30$ $m^2/g$, and $380\pm30$ $m^2/g$, respectively. In addition to above, also usable commercially available products include hydrophilic silicas available from Cabot Corporation and the like. The specific surface area of the hydrophilic silica is, preferably, in the range of from 20 to 600 $m^2/g$.

Further, usable as hydrophobic silica are products generated by surface treatment of hydrophilic silica in which a compound capable of forming a hydrophobic group by reaction with the hydroxyl group that is present on the surface of the hydrophilic silica, or a compound which is adsorbed by the surface of the hydrophilic silica to form a hydrophobic layer thereon, is brought into contact with the hydrophilic silica in the presence or absence of a solvent, preferably, with heating.

The compounds for use in surface treatment of the hydrophilic silica to render it hydrophobic include various types of alkyl-, aryl-, and aralkyl-based silane coupling agents having hydrophobic groups, such as an-octyl trialkoxysilane and the like; silylating agents such as methyltrichlorosilane, dimethyldichlorosilane, and hexamethyldisilazane; silicone oils such as polydimethylsiloxane and the like; higher alcohols such as stearyl alcohol and the like; and higher fatty acids such as stearic acid and the like. Any of the products rendered hydrophobic using the above compounds can be used as the hydrophobic silica.

Examples of the commercially available hydrophobic silica include Aerosil RY200 and R202, which are rendered hydrophobic by surface treatment using silicone oil; Aerosil R974, R972, and R976, which are rendered hydrophobic by surface treatment using a dimethylsilylating agent; Aerosil R805, which is rendered hydrophobic by surface treatment using n-octyltrimethoxysilane; Aerosil R811 and R812, which are rendered hydrophobic by surface treatment using a trimethylsilylating agent (which are all manufactured by Nippon Aerosil Co., Ltd., and are given by trade names). Another example include REOLOSIL MT-10 (trade name, manufactured by Tokuyama Corporation), which is rendered hydrophobic by surface treatment using methyltrichlorosilane. The specific surface areas of these hydrophobic silicas are $100\pm20$ $m^2/g$, $100\pm20$ $m^2/g$, $170\pm20$ $m^2/g$, $110\pm20$ $m^2/g$, $250\pm25$ $m^2/g$, $150\pm20$ $m^2/g$, $150\pm20$ $m^2/g$, $260\pm20$ $m^2/g$, and $120\pm10$ $m^2/g$, respectively. The specific surface area of the hydrophobic silica is, preferably, in the range of from 20 to 400 $m^2/g$.

The preferred content of the fumed silica in the adhesive composition is in a range of from 1 to 30 parts by mass per 100 parts by mass of 2-cyanoacrylic acid ester. The preferred content of the fumed silica depends on the type of the 2-cyanoacrylic acid ester, the types and proportion of the monomers used for the production of the elastomer, the type of the fumed silica and the like; however, more preferably, it is in a range of from 1 to 25 parts by mass, and particularly preferably, from 2 to 20 parts by mass. When the content of the fumed silica is in a range of from 1 to 30 parts by mass, an adhesive composition easy to handle can be obtained without impairing curability, adhesion strength or the like.

EXAMPLES

The present invention is explained in further detail by way of Examples below, but the present invention is not particularly limited thereby. In the description below, parts and percentages are based on mass unless otherwise mentioned.

1. Evaluation Method (1) Molecular Weight
  Apparatus: "Alliance 2695" (manufactured by WATERS CORPORATION)
  Column: Two columns each of "TSKgel SuperMultiporeHZ-H" and "TSKgel SuperHZ-2500" (manufactured by Tosoh Corporation) were connected.
  Column temperature: 40° C.
  Mobile phase: Tetrahydrofuran 0.35 ml/min
  Detector: RI
  The molecular weight measured by GPC was converted to polystyrene-based value.

(2) Adhesion Rate
  The adhesion rate was measured at 23° C. under 60% RH, in accordance with JIS K 6861 "Testing methods for α-cyanoacrylate adhesives". The test piece used in the measurement was as follows:
  ABS: ABS resin "GSE (tradename)", manufactured by UMG ABS, LTD.

(3) Evaluation of Cold/Hot Cycle Resistance
  An aluminum plate (material designated in JISA6061P) and a test piece made of ABS resin ("ABS-N-WN" (trade name), manufactured by Shin-Kobe Electric Machinery Co., Ltd.) were bonded together using each of the adhesive compositions obtained in Examples 1 to 14 and in Comparative Examples 1 to 3, and were allowed to stand still for curing at a temperature of 23° C. under a humidity of 60% RH for 7 days. Then, tensile shear adhesion strength (which is referred to as initial strength) was measured in accordance to JIS K 6861. Subsequently, using a cold/hot impact testing machine, the test pieces were subjected to the hot/cold cycle in which the test piece was maintained at −40° C. for an hour and then at 80° C. for an hour. After the cycle was repeated ten times, the tensile shear adhesion strength (referred to as post test strength) was then measured in a manner similar to above, and the retention rate was calculated according to the following equation.

Retention rate (%)=(post test strength/initial strength)×100

(4) Warm-Water Resistance
  An aluminum plate (material designated in JIS A6061P) and a test piece made of ABS resin ("ABS-N-WN" (trade name), manufactured by Shin-Kobe Electric Machinery Co., Ltd.) were bonded together using each of the adhesive compositions obtained in Examples 1 to 14 and in Comparative Examples 1 to 3, and were allowed to stand still for curing at a temperature of 23° C. under a humidity of 60% RH for 7 days. Then, tensile shear adhesion strength (which is referred to as initial strength) was measured in accordance to JIS K 6861. Then, after immersing the test piece in warm water at 60° C. for one week, the tensile shear adhesion strength (referred to as post test strength) was measured in a manner similar to above, and the retention rate was calculated according to the following equation.

Retention rate (%)=(post test strength/initial strength)×100

(5) Peel Adhesion Test
  A 0.1-mm thick aluminum foil (material designated in JIS 1N30) was used as a test piece, and the adhesive compositions obtained in Examples 1 to 14 and in Comparative Examples 1 to 3 were each used to bond the test pieces. Then, the test pieces were allowed to stand still for curing at a temperature of 23° C. under a humidity of 60% RH for 7 days, and were subjected to 180° peel test for flexible-to-flexible bonded assemblies (T-peel test) according to JIS K6854-3.

(6) Flexibility of Hardened Product
  A 1-mm thick hardened product was prepared, and the universal hardness thereof was measured using a depth sensing indentometer "H100CXYp" (tradename) manufactured by Fischer Technology Inc., under a load of 200 mN and a retention time of 10 seconds.

2. Synthesis of Onium Salt

Synthesis Example 1 methyltri-n-octyl ammonium trifluoromethanesulfonate

In a 50-ml eggplant shape flask were charged 4.041 g (10.00 mmol) of methyltri-n-octylammonium chloride (reagent), 13.2 g (20 mg chemical equivalent) of anion exchange resin (AMBERLITE IRA900A OH AG (trade name), strong base type, manufactured by Organo Corporation), and 25 ml of toluene, and were stirred for 48 hours under room temperature. After filtering off the ion exchange resin, 1.501 g (10.00 mmol) of trifluoromethane sulfonate was dropped into the resulting product under ice cooling. The ice bath was removed, and additional stirring was continued for 12 hours under room temperature. Then, after rinsing three times with 25 ml of ion-exchange water, the resulting product was dried on anhydrous sodium sulfate and condensed under reduced pressure. The thus-obtained residue was dissolved in 25 ml of methanol to filter off the insoluble matter. The solvent was distilled away under reduced pressure to obtain 5.022 g of pale yellow semisolid (Onium salt A).

3. Production of Adhesive Composition

Example 1

To ethyl 2-cyanoacrylate (provided that ethyl 2-cyanoacrylate is 100 parts) were blended 20 ppm of sulfur dioxide, 1000 ppm of hydroquinone, and 0.005 parts of methane sulfonate (which is a reagent manufactured by Kishida Chemical Co., Ltd., pKa=−0.6 [25° C.]) as the acid catalyst. Then, 20 parts of an elastomer (ethylene/methyl acrylate copolymer, "Vamac G" (trade name) manufactured by DuPont,) shown in Table 1 was dissolved therein, and 50 parts by mass of the polymer having hydrolyzable groups ("Silyl SAT200" (trade name) manufactured by Kaneka Corporation) to which 1.5 parts of vinylmethoxysilane ("A-171" (trade name) manufactured by Momentive Performance Materials Inc.) was previously added was blended at the amount shown in Table 1. The blend thus obtained was mixed under stirring for 10 minutes in a temperature range of from 15 to 30° C. to prepare the adhesive composition. The adhesive composition thus obtained was subjected to above evaluations. The results are shown in Table 2.

TABLE 1

| Examples | 2-Cyanoacrylic acid ester | Polymer having hydrolyzable silyl group Type | Content (parts by mass) | Elastomer Type | Content (parts by mass) | Acid catalyst Type | | Content (parts by mass) |
|---|---|---|---|---|---|---|---|---|
| 1 | Ethyl 2-cyanoacrylate | Silyl SAT200 | 50 | Vamac G | 20 | methane sulfonate | Reagent from Kishida Chemical Co., Ltd. | 0.005 |
| 2 | Ethyl 2-cyanoacrylate | Silyl SAT200 | 50 | Vamac Ultra LT | 20 | methane sulfonate | Reagent from Kishida Chemical Co., Ltd. | 0.005 |
| 3 | Ethyl 2-cyanoacrylate | Silyl MA440 | 50 | Vamac G | 20 | methane sulfonate | Reagent from Kishida Chemical Co., Ltd. | 0.002 |
| 4 | Ethyl 2-cyanoacrylate | Silyl SAT200 | 50 | Vamac G | 20 | dibutyl phosphate | Reagent from Tokyo Chemical Industry Co., Ltd. | 0.2 |

TABLE 2

| Examples | Adhesion rate (seconds) | Resistance to cold/hot cycles | | | Warm water resistance | | | Peel adhesion strength (N/cm) | Universal hardness (N/mm$^2$) |
|---|---|---|---|---|---|---|---|---|---|
| | | Initial strength (N/mm$^2$) | Post test strength (N/mm$^2$) | Retention rate (%) | Initial strength (N/mm$^2$) | Post test strength (N/mm$^2$) | Retention rate (%) | | |
| 1 | 180 | 3.5 | 2.9 | 83 | 3.5 | 2.4 | 69 | 4.2 | 1.9 |
| 2 | 180 | 3.2 | 2.8 | 88 | 3.2 | 2.2 | 69 | 4.8 | 0.8 |
| 3 | 120 | 4.9 | 4.1 | 85 | 4.9 | 3.2 | 65 | 4.1 | 3.8 |
| 4 | 300 | 3.4 | 3.1 | 90 | 3.4 | 2.1 | 62 | 3.1 | 2.0 |

Examples 2 to 4

Adhesive compositions were prepared and evaluated in the same manner as in Example 1, except that the acid catalyst of the type and amount, the elastomer ("Vamac" (trade name) series, manufactured by DuPont, see Table 3) of the type and amount, and the polymer having the hydrolyzable silyl groups ("Silyl" (trade name) series, manufactured by Kaneka Corporation, see Table 4) of the type and amount as shown in Table 1 were added to 2-cyanoacrylate. The pKa of the acid catalyst, i.e., dibutyl phosphate, was 1.72 (25° C.). The results are given in Table 2.

In Table 3, "E" denotes ethylene, "MA" denotes methyl acrylate, "AA" denotes acrylic acid, and "BA" denotes butyl acrylate.

TABLE 3

| | Copolymer composition (mol %) | | | | Average Molecular Weight ($\times 10^4$) | |
|---|---|---|---|---|---|---|
| VAMAC series | E | MA | AA | BA | Mn | Mw |
| G | 70.0 | 29.2 | 0.8 | 0 | 3.3 | 26.2 |
| Ultra LT | 64.6 | 14.5 | 2.0 | 19.0 | 8.1 | 27.5 |

TABLE 4

| Silyl series | Main chain chemical structure | Hydrolyzable silyl group | Number Average Molecular weight |
|---|---|---|---|
| SAT200 | polypropylene glycol | methyldimethoxy silyl group | 12700 |
| SAT400 | polypropylene glycol | methyldimethoxy silyl group | 26600 |
| SAT580 | polypropylene glycol | trimethoxysilyl group | 32400 |
| MA440 | acrylic | methyldimethoxysilyl group | 10100 |

Example 5

To ethyl 2-cyanoacrylate (provided that ethyl 2-cyanoacrylate is 100 parts) were blended 20 ppm of sulfur dioxide, 1000 ppm of hydroquinone, and 0.09 parts of methane sulfonate. Then, after dissolving therein an elastomer (ethylene/methyl acrylate copolymer, "Vamac DP" (trade name) manufactured by DuPont) given in Table 5, the polymer having hydrolyzable groups ("Silyl SAT200" (trade name) manufactured by Kaneka Corporation) to which 1.5 parts of vinylmethoxysilane ("A-171" (trade name) manufactured by Momentive Performance Materials Inc.) was previously added and the onium salt A prepared in Synthesis Example 1 were blended at amounts shown in Table 5, and the blends thus obtained was mixed under stirring for 10 minutes in a temperature range of from 15 to 30° C. to prepare the adhesive composition. The adhesive composition thus obtained was subjected to evaluations in the same manner as in Example 1. The results are shown in Table 6.

Examples 6 to 14

Adhesive compositions were prepared and evaluated in the same manner as in Example 1, except that the acid catalyst of the type and amount, the elastomer ("Vamac" (trade name) series, manufactured by DuPont, see Table 3) of the type and amount, the polymer having the hydrolyzable silyl groups ("Silyl" (trade name) series manufactured by Kaneka Corporation, see Table 4) of the type and amount, and the onium salts of the type and amount as shown in Table 5 were added to 2-cyanoacrylate (in case of Examples 13 and 14, isobutyl 2-cyanoacrylate). The results are given in Table 6.

TABLE 5

| Ex. | 2-Cyanoacrylic acid ester | Polymer having hydrolyzable silyl group Type | Content (parts by mass) | Elastomer Type | Content (parts by mass) |
|---|---|---|---|---|---|
| 5 | Ethyl 2-cyanoacrylate | Silyl SAT200 | 50 | Vamac G | 20 |
| 6 | Ethyl 2-cyanoacrylate | Silyl SAT200 | 20 | Vamac Ultra LT | 38 |
| 7 | Ethyl 2-cyanoacrylate | Silyl MA440 | 50 | Vamac Ultra LT | 38 |
| 8 | Ethyl 2-cyanoacrylate | Silyl SAT200 | 50 | Vamac Ultra LT | 20 |
| 9 | Ethyl 2-cyanoacrylate | Silyl SAT200 | 30 | Vamac Ultra LT | 20 |
| 10 | Ethyl 2-cyanoacrylate | Silyl SAT200 | 20 | Vamac Ultra LT | 20 |
| 11 | Ethyl 2-cyanoacrylate | Silyl SAT200 | 50 | Vamac Ultra LT | 20 |
| 12 | Ethyl 2-cyanoacrylate | Silyl SAT200 | 50 | Vamac Ultra LT | 20 |
| 13 | Ethyl 2-cyanoacrylate 70 parts Isobutyl 2-cyanoacrylate 30 parts | Silyl SAT200 Silyl SAT400 Silyl SAT580 | 30 10 10 | Vamac Ultra LT | 30 |
| 14 | Ethyl 2-cyanoacrylate 70 parts Isobutyl 2-cyanoacrylate 30 parts | Silyl SAT200 | 50 | Vamac Ultra LT | 30 |

| Ex. | Acid catalyst Type | | Content (parts by mass) | Onium Salt Type | | Content (parts by mass) |
|---|---|---|---|---|---|---|
| 5 | methane sulfonate | Reagent from Kishida Chemical Co., Ltd. | 0.09 | methyltri-n-octylammonium trifluoromethane sulfonate | A | 1.49 |
| 6 | methane sulfonate | Reagent from Kishida Chemical Co., Ltd. | 0.04 | methyltri-n-octylammonium trifluoromethane sulfonate | A | 1.83 |
| 7 | methane sulfonate | Reagent from Kishida Chemical Co., Ltd. | 0.04 | triethylsulfonium bis(trifluoromethanesulfonyl)imide | Reagent, Tokyo Chemical Industry Co., Ltd. | 1.45 |
| 8 | methane sulfonate | Reagent from Kishida Chemical Co., Ltd. | 0.09 | methyltri-n-octylammonium trifluoromethane sulfonate | A | 1.49 |
| 9 | methane sulfonate | Reagent from Kishida Chemical Co., Ltd. | 0.09 | methyltri-n-octylammonium trifluoromethane sulfonate | A | 0.74 |
| 10 | methane sulfonate | Reagent from Kishida Chemical Co., Ltd. | 0.09 | methyltri-n-octylammonium trifluoromethane sulfonate | A | 0.15 |
| 11 | methane sulfonate | Reagent from Kishida Chemical Co., Ltd. | 0.09 | 1-butyl-3-methylimidazolium hydrogensulfate | Merck Reagent | 0.34 |
| 12 | methane sulfonate | Reagent from Kishida Chemical Co., Ltd. | 0.05 | 1-ethyl-3-methylimidazolium bis(trifluoromethanesulfonyl)imide | Reagent, Tokyo Chemical Industry Co., Ltd. | 0.07 |

TABLE 5-continued

| | | | | | | |
|---|---|---|---|---|---|---|
| 13 | methane sulfonate | Reagent from Kishida Chemical Co., Ltd. | 0.04 | triethylsulfonium bis(trifluoromethanesulfonyl)imide | Reagent, Tokyo Chemical Industry Co., Ltd. | 1.45 |
| 14 | methane sulfonate | Reagent from Kishida Chemical Co., Ltd. | 0.02 | methyltri-n-octylammonium trifluoromethane sulfonate | A | 1.47 |

TABLE 6

| Examples | Adhesion rate (seconds) | Resistance to cold/hot cycles | | | Warm water resistance | | | Peel adhesion strength (N/cm) | Univerasal hardness (N/mm²) |
|---|---|---|---|---|---|---|---|---|---|
| | | Initial strength (N/mm²) | Post test strength (N/mm²) | Retention rate (%) | Initial strength (N/mm²) | Post test strength (N/mm²) | Retention rate (%) | | |
| 5 | 60 | 3.4 | 3.5 | 103 | 3.4 | 2.4 | 71 | 5.0 | 1.8 |
| 6 | 90 | 5.6 | 2.7 | 49 | 5.6 | 3.2 | 57 | 4.6 | 0.9 |
| 7 | 180 | 4.6 | 3.9 | 85 | 4.6 | 3.2 | 70 | 4.4 | 2.3 |
| 8 | 45 | 3 | 2.2 | 73 | 3.0 | 2.0 | 67 | 5.7 | 0.8 |
| 9 | 30 | 3.8 | 3.4 | 89 | 3.8 | 2.5 | 66 | 7.2 | 1.1 |
| 10 | 20 | 5.5 | 4.3 | 78 | 5.5 | 3.4 | 62 | 6.9 | 1.3 |
| 11 | 300 | 2.7 | 2.3 | 85 | 2.7 | 1.9 | 70 | 4.9 | 0.8 |
| 12 | 90 | 2.5 | 2.4 | 96 | 2.5 | 1.7 | 68 | 4.5 | 0.8 |
| 13 | 300 | 3.4 | 3.5 | 103 | 3.4 | 3.5 | 103 | 6.1 | 0.8 |
| 14 | 60 | 5.3 | 3.6 | 68 | 5.3 | 4.6 | 87 | 5.1 | 0.7 |

Comparative Example 1

Production was conducted in the same manner as in Example 1, except for not adding an elastomer. However, evaluation of the product was impossible because 2-cyanoacrylate could not be mixed with the polymer having hydrolyzable silyl groups and the product underwent instantaneous exothermic reaction and gelation.

Comparative Example 2

Production was conducted in the same manner as in Example 1, except for not blending an acid catalyst. Although 2-cyanoacrylate could be mixed with the polymer having hydrolyzable silyl groups, the evaluation was impossible because the product quickly thickened and gelated.

Comparative Example 3

Production and evaluation were conducted in the same manner as in Example 1, except for not blending the polymer having hydrolyzable silyl groups. The results are given in Table 8.

TABLE 7

| Comparative Examples | 2-Cyanoacrylic acid ester | Polymer having hydrolyzable silyl group | | Elastomer | | Acid catalyst | |
|---|---|---|---|---|---|---|---|
| | | Type | Content (parts by mass) | Type | Content (parts by mass) | Type | Content (parts by mass) |
| 1 | Ethyl 2-cyanoacrylate | Silyl SAT200 | 50 | — | — | methane sulfonate | Reagent from Kishida Chemical Co., Ltd. 0.005 |
| 2 | Ethyl 2-cyanoacrylate | Silyl SAT200 | 50 | Vamac G | 20 | — | — |
| 3 | Ethyl 2-cyanoacrylate | — | — | Vamac G | 20 | methane sulfonate | Reagent from Kishida Chemical Co., Ltd. 0.002 |

TABLE 8

| Comparative Examples | Adhesion rate (seconds) | Resistance to cold/hot cycles | | | Warm water resistance | | | Peel adhesion strength (N/cm) | Univerasal hardness (N/mm²) |
|---|---|---|---|---|---|---|---|---|---|
| | | Initial strength (N/mm²) | Post test strength (N/mm²) | Retention rate (%) | Initial strength (N/mm²) | Post test strength (N/mm²) | Retention rate (%) | | |
| 1 | | Cannot be mixed, but gelated. | | | | | | | |
| 2 | | Thickened immediately after mixing, and gelated | | | | | | | |
| 3 | 180 | 7.5 | 0.6 | 8 | 7.5 | 2.9 | 39 | 7.6 | 83 |

INDUSTRIAL APPLICABILITY

The present invention can be utilized as a so-called instantaneous adhesive containing 2-cyanoacrylic acid ester, not only in household applications and medical fields, but also in a wide range of products and technical fields including various types of industries. It is particularly useful for applications in which adhesion durability such as cold/hot cycle and warm water resistances are required.

The invention claimed is:

1. An adhesive composition which comprises (a) a 2-cyanoacrylic acid ester, (b) a polymer having a hydrolyzable silyl group, (c) an elastomer, and (d) an acid catalyst, in which the contents of the components (b), (c), and (d) are from 5 to 200 parts by mass, from 5 to 50 parts by mass, and from 0.0005 to 0.5 parts by mass, respectively, relative to 100 parts by mass of the component (a).

2. The adhesive composition according to claim 1, wherein the main chain chemical structure of the polymer (b) having a hydrolyzable silyl group is at least one polymer selected from the group consisting of oxyalkylene polymer, vinyl polymer, polyester polymer, polyurethane polymer, and polycarbonate polymer.

3. The adhesive composition according to claim 1, wherein the polymer (b) having a hydrolyzable silyl group has a number average molecular weight of from 500 to 50,000.

4. The adhesive composition according to claim 1, wherein the elastomer (c) is a copolymer made from a monomer capable of forming a polymer poorly soluble to 2-cyanoacrylic acid ester and a monomer capable of forming a polymer soluble to 2-cyanoacrylic acid ester.

5. The adhesive composition according to claim 1, wherein the elastomer (c) is a copolymer made from a monomer capable of forming a polymer poorly soluble to 2-cyanoacrylic acid ester, a monomer capable of forming a polymer soluble to 2-cyanoacrylic acid ester, and a monomer containing a carboxyl group.

6. The adhesive composition according to claim 4, wherein the monomer capable of forming a polymer poorly soluble to 2-cyanoacrylic acid ester is at least one selected from ethylene, propylene, isoprene, and butadiene, and the monomer capable of forming a polymer soluble to 2-cyanoacrylic acid ester is at least one selected from acrylic acid esters and methacrylic acid esters.

7. The adhesive composition according to claim 1, wherein the acid catalyst (d) is an acid having a pKa of 4 or lower at 25° C.

8. The adhesive composition according to claim 1, wherein the acid catalyst (d) is at least one selected from the group consisting of sulfonic acid, phosphoric acid, phosphoric acid monoesters, phosphoric acid diesters, phosphorous acid, and phosphorous acid esters.

9. The adhesive composition according to claim 1, which further comprises an onium salt (e) represented by the following general formula (1):

$$C^+A^- \quad (1)$$

wherein $C^+$ is an onium cation, and $A^-$ is a hydrogen sulfate anion, a hydrogen sulfite anion, a sulfonate anion represented by $R^1SO_3^-$ wherein $R^1$ represents an alkyl group, perfluoroalkyl group, cycloalkyl group, vinyl group, aryl group, perfluoroaryl group, aralkyl group or halogen atom; or a bis(substituted sulfonyl)imide anion represented by $(R^2SO_2)_2N^-$ wherein $R^2$ represents an alkyl group, perfluoroalkyl group, or aryl group; tetrafluoroborate anion, or hexafluorophosphate anion.

10. The adhesive composition according to claim 9, wherein the cation of the onium salt (e) is at least one onium cation selected from the group consisting of quaternary ammonium cation, imidazolium cation, pyridinium cation, and tertiary sulfonium cation.

11. The adhesive composition according to claim 9, which contains the onium salt (e) in an amount of from 0.001 to 5 parts by mass, relative to 100 parts by mass of the 2-cyanoacrylic acid ester (a).

12. The adhesive composition according to claim 1, wherein the main chain chemical structure of the polymer (b) having a hydrolyzable silyl group is at least one polymer selected from the group consisting of oxyalkylene polymer, vinyl polymer, polyester polymer, polyurethane polymer, and polycarbonate polymer; the elastomer (c) is a copolymer made from a monomer capable of forming a polymer poorly soluble to 2-cyanoacrylic acid ester and a monomer capable of forming a polymer soluble to 2-cyanoacrylic acid ester; the acid catalyst (d) is at least one selected from the group consisting of sulfonic acid, phosphoric acid, phosphoric acid monoesters, phosphoric acid diesters, phosphorous acid, and phosphorous acid esters; and an onium salt (e) represented by the following general formula (1):

$$C^+A^- \quad (1)$$

wherein $C^+$ is an onium cation, and $A^-$ is a hydrogen sulfate anion, a hydrogen sulfite anion, a sulfonate anion represented by $R^1SO_3^-$ wherein $R^1$ represents an alkyl group, perfluoroalkyl group, cycloalkyl group, vinyl group, aryl group, perfluoroaryl group, aralkyl group or halogen atom; or a bis(substituted sulfonyl)imide anion represented by $(R^2SO_2)_2N^-$ wherein $R^2$ represents an alkyl group, perfluoroalkyl group, or aryl group; tetrafluoroborate anion, or hexafluorophosphate anion.

* * * * *